(12) United States Patent
Johnson

(10) Patent No.: US 8,360,011 B2
(45) Date of Patent: Jan. 29, 2013

(54) CANINE SECURITY LEASH

(76) Inventor: Orion Johnson, Huntington Beach, CA (US)

( * ) Notice: Subject to any disclaimer, the term of this patent is extended or adjusted under 35 U.S.C. 154(b) by 109 days.

(21) Appl. No.: 12/910,382

(22) Filed: Oct. 22, 2010

(65) Prior Publication Data

US 2011/0214620 A1 Sep. 8, 2011

Related U.S. Application Data

(60) Provisional application No. 61/310,956, filed on Mar. 5, 2010.

(51) Int. Cl.
*A01K 27/00* (2006.01)

(52) U.S. Cl. ......... 119/792; 119/712; 119/795; 119/864

(58) Field of Classification Search .................. 119/712, 119/769, 795, 792, 771, 793, 797, 798, 770, 119/857, 864, 907, 863; D30/151, 153
See application file for complete search history.

(56) References Cited

U.S. PATENT DOCUMENTS

| 794,563 | A | * | 7/1905 | Stahlknecht | 119/776 |
|---|---|---|---|---|---|
| 937,800 | A | * | 10/1909 | Hazzard | 119/776 |
| 1,037,782 | A | * | 9/1912 | Luecke | 54/34 |
| 4,903,638 | A | * | 2/1990 | Lacey | 119/776 |
| 6,382,139 | B1 | * | 5/2002 | Rhodes | 119/776 |
| 6,618,863 | B2 | * | 9/2003 | Blechman | 2/311 |
| 2008/0121191 | A1 | * | 5/2008 | Wu | 119/770 |
| 2009/0071417 | A1 | * | 3/2009 | Simmensen | 119/793 |
| 2011/0226192 | A1 | * | 9/2011 | Colla | 119/792 |

* cited by examiner

*Primary Examiner* — Andrea Valenti
(74) *Attorney, Agent, or Firm* — George P. White

(57) ABSTRACT

A security leash includes a main leash and a secondary leash. Should the main leash be dropped by an animal's handler, or if the clip at the end of the main leash should fail, or if the collar on the animal should fail, the secondary leash may continue to secure the animal.

5 Claims, 2 Drawing Sheets

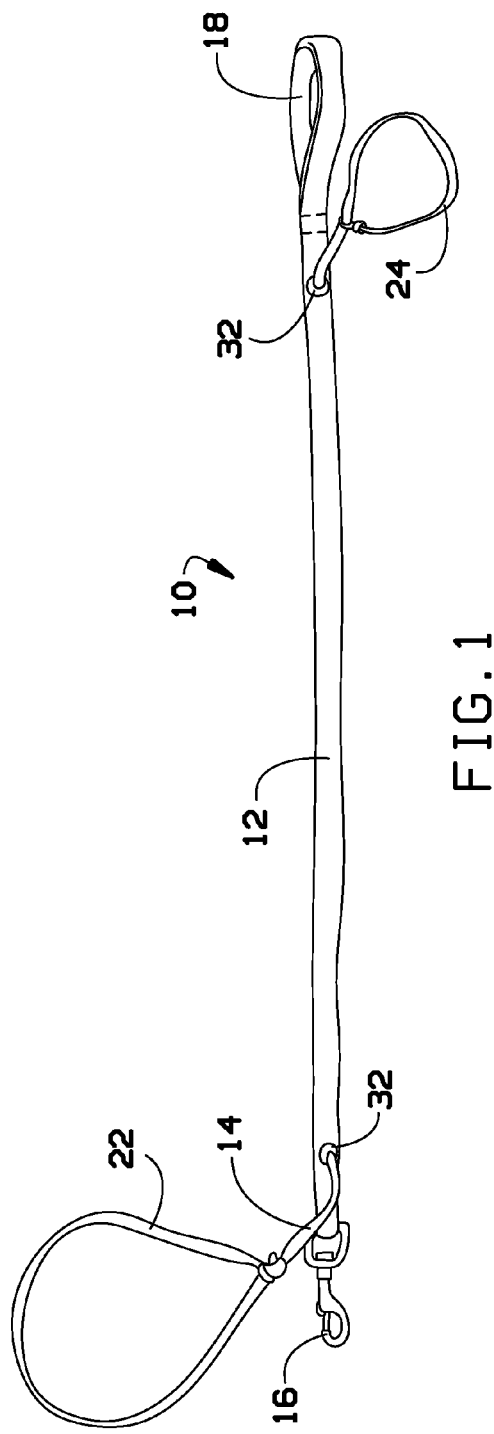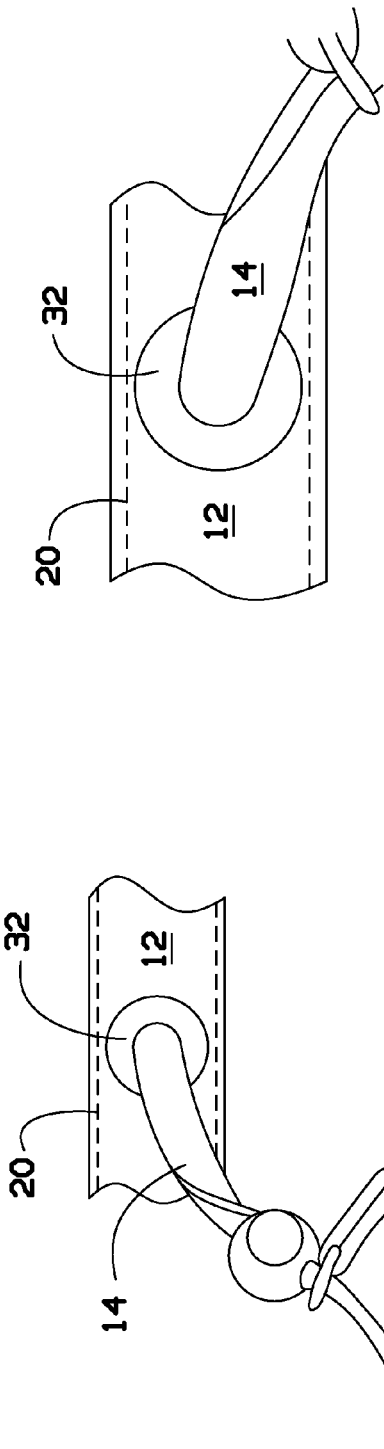

CANINE SECURITY LEASH

CROSS-REFERENCE TO RELATED APPLICATIONS

This application claims the benefit of priority of U.S. Provisional patent application No. 61/310,956, filed Mar. 5, 2010, which is herein incorporated by reference in its entirety.

BACKGROUND OF THE INVENTION

The present invention relates to animal leashes and, more particularly, to a canine security leash which will prevent escape of the canine if the leash is dropped by the handler or during clip and/or collar failure.

Current leashes are not secure if dropped by the handler or if a clip (attaching the leash to the animal's collar) or collar fails.

As can be seen, there is a need for a leash that may keep an animal attached to the leash secure if the leash is dropped or if a leash clip or the animal's collar fails.

SUMMARY OF THE INVENTION

In one aspect of the present invention, a leash comprises a main leash; a secondary leash attached to the main leash, wherein the secondary leash may move relative to the main leash.

In another aspect of the present invention, a leash comprises a main leash formed of two pieces of material stitched together to form a channel along at least a portion of the main leash; a first eyelet near a handle of the main leash; a second eyelet near an attachment mechanism of the main leash, wherein the first and second eyelets permit access to the channel; a secondary leash passing through the first and second eyelets and extending through at least a portion of the channel in the main leash.

These and other features, aspects and advantages of the present invention will become better understood with reference to the following drawings, description and claims.

BRIEF DESCRIPTION OF THE DRAWINGS

FIG. 1 is a perspective view of a security leash according to an embodiment of the present invention;

FIG. 2 is a close-up view of a region where an inner leash exits the outer leash at an animal attachment end of the security leash of FIG. 1;

FIG. 3 is a close-up view of a region where the inner leash exits the outer leash at a handler attachment end of the security leash of FIG. 1;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a security leash having a main leash and a secondary leash. Should the main leash be dropped by an animal's handler, or if the clip at the end of the main leash should fail, or if the collar on the animal should fail, the secondary leash may still secure the animal.

Figure 4:
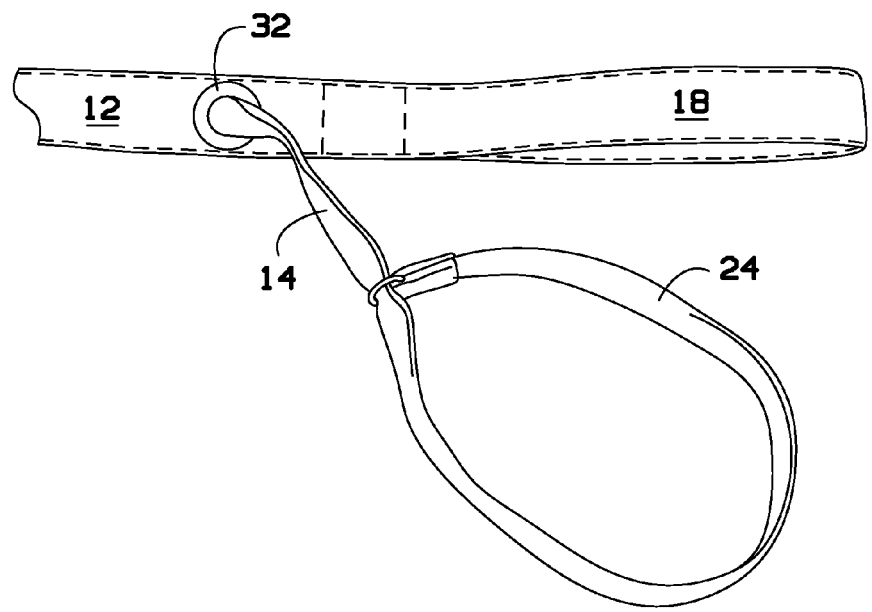
FIG. 4 is a close-up view of a handler attachment end of the security leash of FIG. 1.
Figure 5:
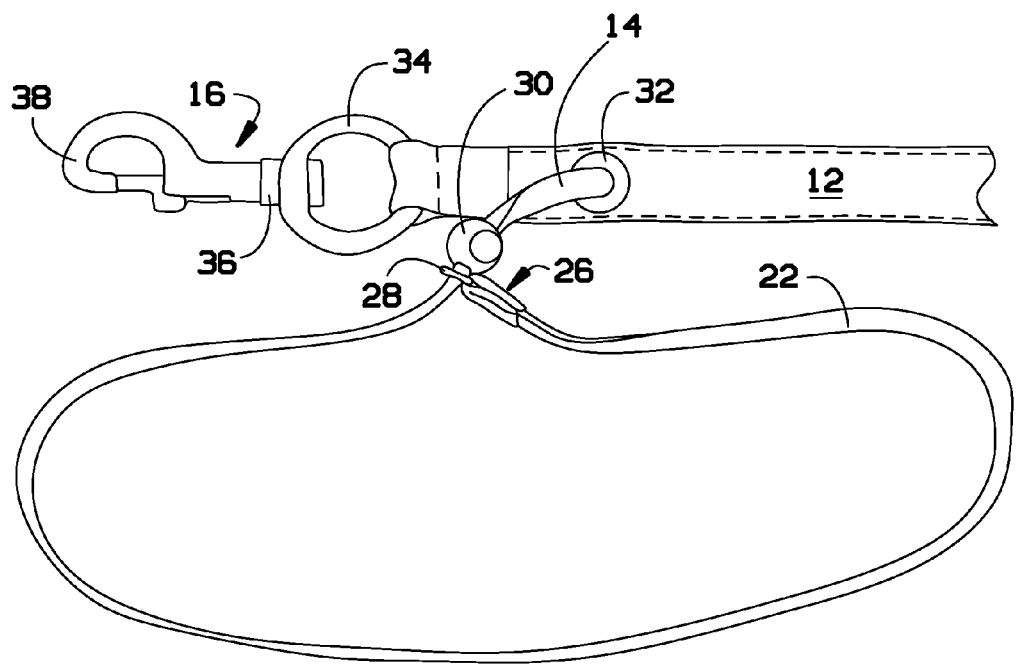
FIG. 5 is a close-up view of an animal attachment end of the security leash of FIG. 1.

Referring to FIGS. 1 through 5, a security leash 10 may include a main leash 12 and a secondary leash 14. The main leash 12 may have a hooking mechanism 16 at one end thereof. The hooking mechanism 16 may attach to a collar or harness of an animal, such as a dog. The hooking mechanism 16 may include a ring 34, attached to the main leash 12, and a swivel 36, swivelly connecting the ring to a hook 38. The other end of the main leash 12, opposite the hooking mechanism 16, may include a handle 18.

The main leash 12 may be made of conventional materials, such as webbing material, for example, a nylon webbing. The main leash 12 may be from about ½ inch to about 1.5 inches in width and from about 48 inches to about 72 inches in length. In one embodiment, the main leash 12 may be made of a length of material, for example a 10 foot long length of material, folded in half on itself to form, for example, a 5 foot length of two-ply material. The two-ply material may have stitching 20 on each side thereof to form a channel in the main leash 12.

The secondary leash 14 may have an animal attachment mechanism 22 on one end thereof and a secondary handle 24 on a second, opposite end thereof. The animal attachment mechanism 22 may be a sling/choker type of mechanism, wherein the end 26 of the secondary leash 14 may have a ring 28 attached thereto. The secondary leash 14 may pass through the ring 28 to form the animal attachment mechanism 22. An adjustment mechanism, such as a push-button catch 30, may be disposed on the secondary leash 14. The catch 30 may be moved along the secondary leash 14 to adjust the maximum size of the opening formed by the animal attachment mechanism. The secondary handle 24 may be a sling/choker type of mechanism, similar to the animal attachment mechanism.

The secondary leash 14 may be secured to the main leash 12. In use, the main leash 12 may be used for walking an animal, such as a dog. The animal attachment mechanism 22 of the secondary leash 14 may fit on the animal. The secondary handle 24 may be attached to a user. If the main leash 12 should fail, the secondary leash 14 may still be used to secure the animal.

The secondary leash 14 may be sized to move relative to the main leash 12. For example, when the secondary leash 14 runs inside of the main leash 12, the secondary leash 14 should be smaller in width than the distance between the stitching 20 on each side of the main leash 12.

In one embodiment, the main leash 12 may be a two ply leash stitched together. Near each end of the main leash 12, eyelets 32 may be attached to one of the two plies of the main leash 12. The secondary leash 14 may move freely inside of the main leash, exiting from the eyelets 32. In this configuration, the main leash 12 and the secondary leash 14 may appear, over most of its length, as a single leash. In alternate embodiments, the secondary leash may run through hoops or rings attached along the main leash 12. In a further alternate embodiment, eyelets may be punched through the main leash 12 and the secondary least 14 may be threaded through the eyelets.

It should be understood, of course, that the foregoing relates to exemplary embodiments of the invention and that modifications may be made without departing from the spirit and scope of the invention as set forth in the following claims.

What is claimed is:

1. A leash comprising:

a main leash comprising a hollow channel along at least a portion of the main leash; the main leash having a handle at one extremity and an animal collar engagement clip at the opposing extremity;

a first hole near the handle of the main leash;

a second hole near the animal collar engagement clip end of the main leash, wherein the first and second holes permit access to the hollow channel;

a secondary leash passing through the first hole and extending through at least a portion of the hollow channel in the main leash and exiting from the second hole, allowing relative longitudinal motion while constrained adjacent with the main leash;

the secondary leash comprising a ring at each end, each ring receiving a portion of the secondary leash therethrough creating a self-tightening loop at each end, at least one of the self-tightening loops can expand to accommodate an animal's head; wherein both the main leash and the secondary leash are structured to securely retain an attached animal independently from one another.

2. The leash of claim 1 where the hollow channel is formed by stitching two pieces of material together along the sides thereof.

3. The leash of claim 1 where at least the main leash is comprised of a nylon webbing material.

4. The leash of claim 1 further comprising a stop with a readily adjustable position that limits the maximum size of the self-tightening loop for engaging the animal's head.

5. The leash of claim 1 where the clip is a spring-loaded swiveling latch.

* * * * *